(12) United States Patent
Matsushima et al.

(10) Patent No.: US 11,804,654 B2
(45) Date of Patent: Oct. 31, 2023

(54) COIL COMPONENT AND WIRELESS COMMUNICATION CIRCUIT USING THE SAME

(71) Applicant: TDK Corporation, Tokyo (JP)

(72) Inventors: Masaki Matsushima, Tokyo (JP); Makoto Orikasa, Tokyo (JP); Ryota Uchiyama, Tokyo (JP); Junpei Hayama, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 17/403,575

(22) Filed: Aug. 16, 2021

(65) Prior Publication Data

US 2022/0059938 A1 Feb. 24, 2022

(30) Foreign Application Priority Data

Aug. 18, 2020 (JP) .................. 2020-138226

(51) Int. Cl.
*H01Q 1/36* (2006.01)
*H01Q 7/00* (2006.01)
*H01Q 1/38* (2006.01)

(52) U.S. Cl.
CPC .............. *H01Q 7/00* (2013.01); *H01Q 1/38* (2013.01)

(58) Field of Classification Search
CPC .. H01Q 7/00; H01Q 1/38; H01Q 1/36; H01Q 7/06; H04B 5/0031; H04B 5/0081; H01F 17/04; H01F 17/0006; H01F 27/2804; H01F 27/34; H01F 2017/048
See application file for complete search history.

(56) References Cited

U.S. PATENT DOCUMENTS

| | | | |
|---|---|---|---|
| 2013/0175984 A1 | 7/2013 | Yamazaki et al. | |
| 2015/0340754 A1* | 11/2015 | Asou | H01Q 1/2225 343/788 |
| 2019/0096566 A1* | 3/2019 | Odahara | H01F 27/292 |
| 2021/0249171 A1* | 8/2021 | Okumura | H01F 38/14 |

FOREIGN PATENT DOCUMENTS

| | | |
|---|---|---|
| JP | 2013-140880 A | 7/2013 |
| JP | 2015-220719 A | 12/2015 |

* cited by examiner

*Primary Examiner* — David E Lotter
(74) *Attorney, Agent, or Firm* — McDermott Will & Emery LLP (57) ABSTRACT

Disclosed herein is a coil component that includes a substrate, a coil pattern formed on one surface of the substrate, and a magnetic layer comprising a composite material obtained by dispersing magnetic particles in resin and formed on the one surface of the substrate so as to cover the coil pattern. The coil pattern has a flat shape in which a thickness thereof is smaller than a radial width. Each of the magnetic particles has a flat shape in which a thickness thereof in a direction perpendicular to the one surface of the substrate is smaller than a diameter in a direction parallel to the one surface of the substrate. Some of the magnetic particles exist within a height range of the coil pattern with respect to the one surface of the substrate.

19 Claims, 6 Drawing Sheets

COIL COMPONENT AND WIRELESS COMMUNICATION CIRCUIT USING THE SAME

BACKGROUND

Field

The present disclosure relates to a coil component and, more particularly, to a coil component functioning as an antenna coil when connected to a communication circuit and a wireless communication circuit using such a coil component.

Description of Related Art

A coil component functioning as an antenna coil when connected to a communication circuit is described in JP 2015-220719A, which discloses in FIG. 8 thereof a method of forming a magnetic layer by directly applying paste containing magnetic particles onto a coil pattern.

However, the coil pattern described in JP 2015-220719A has a high aspect ratio (ratio of thickness of the coil pattern to the width thereof), which makes it difficult for the magnetic particles to enter between radially adjacent turns of the coil pattern. To facilitate entering of the magnetic particles, it is preferable to use spherical magnetic particles produced by an atomizing method as described in JP 2013-140880A; however, it is difficult to enhance the permeability of the magnetic layer with the spherical magnetic particles.

SUMMARY

It is therefore an object of the present disclosure to, in a coil component having a structure in which a coil pattern is covered with a magnetic layer, enhance the permeability of the magnetic layer.

A coil component according to the present disclosure includes: a substrate; a coil pattern formed on one surface of the substrate; and a magnetic layer comprising a composite material obtained by dispersing magnetic particles in resin and formed on the one surface of the substrate so as to cover the coil pattern. The coil pattern has a flat shape in which the thickness thereof is smaller than the radial width. Each of the magnetic particles has a flat shape in which the thickness thereof in a direction perpendicular to the one surface of the substrate is smaller than the diameter in a direction parallel to the one surface of the substrate, and some of the magnetic particles exist within the height range of the coil pattern with respect to the one surface of the substrate.

BRIEF DESCRIPTION OF THE DRAWINGS

The above features and advantages of the present disclosure will be more apparent from the following description of certain preferred embodiments taken in conjunction with the accompanying drawings, in which:

FIGS. 5A and 5B are schematic views for explaining the shape of a magnetic particle 4a contained in a magnetic layer 4, in which

FIGS. 8A and 8B are schematic views each used for explaining a parasitic capacitance between adjacent turns of a coil pattern 3, in which

DETAILED DESCRIPTION OF THE EMBODIMENTS

Hereinafter, a preferred embodiment of the present disclosure will be described with reference to the accompanying drawings.

Figure 1:
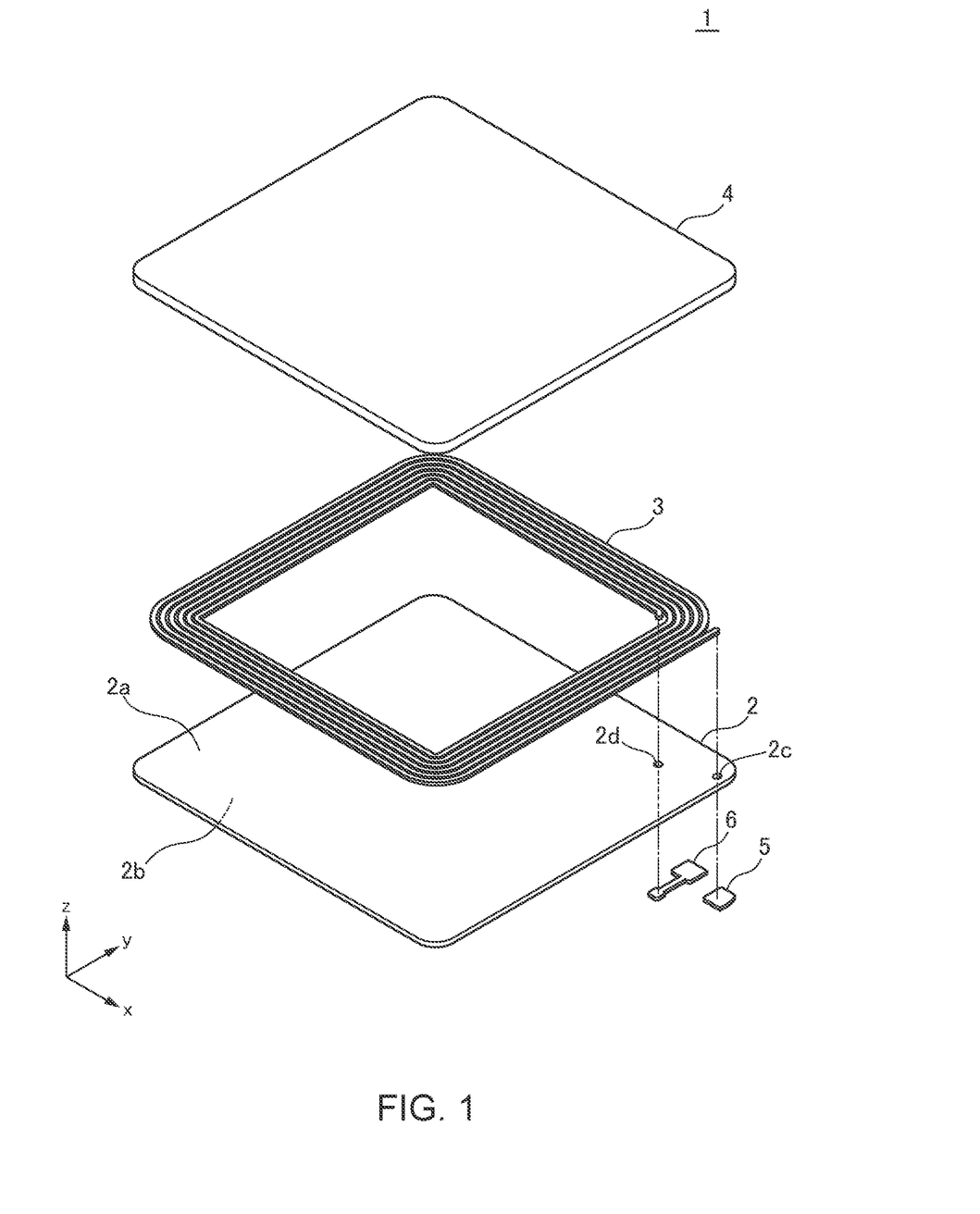
FIG. 1 is a schematic exploded perspective view for explaining the structure of a coil component 1 according to an embodiment of the present disclosure.
Figure 2:
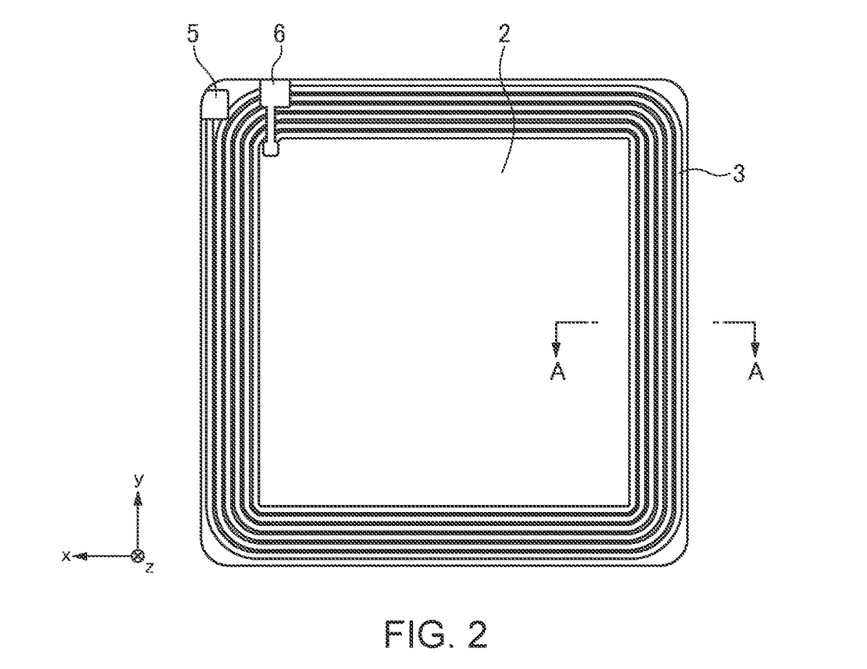
FIG. 2 is a schematic plan view of the coil component 1.

FIG. 1 is a schematic exploded perspective view for explaining the structure of a coil component 1 according to an embodiment of the present disclosure. FIG. 2 is a schematic plan view of the coil component 1.

As illustrated in FIGS. 1 and 2, the coil component 1 according to the present embodiment includes a substrate 2 made of an insulating resin material such as PET resin, a flat spiral coil pattern 3 made of copper (Cu) and formed on one surface 2a of the substrate 2, and a magnetic layer formed on the surface 2a of the substrate 2 so as to cover the coil pattern 3. In the example illustrated in FIGS. 1 and 2, the number of turns of the coil pattern 3 is six, but not limited thereto, and may be one. The outer and inner peripheral ends of the coil pattern 3 are connected respectively to terminal electrodes 5 and 6 formed on the other surface 2b of the substrate 2 respectively through via holes 2c and 2d formed in the substrate 2. The coil pattern 3 can be formed by plating.

The magnetic layer 4 functions as a magnetic path for a magnetic field generated from the coil pattern 3 and is thus required to have high permeability. The magnetic layer 4 used in the present embodiment is made of a composite material obtained by dispersing magnetic particles in resin and is formed by, after formation of the coil pattern 3 on the surface 2a of the substrate 2, directly applying the above composite material onto the surface 2a of the substrate 2 so as to cover the coil pattern 3. Thus, no non-magnetic material (e.g., a film) other than resin constituting the magnetic layer 4 is not interposed between the coil pattern 3 and the magnetic layer 4, and a part of the magnetic layer 4 is filled between the adjacent turns of the coil pattern 3. As a result, it is possible to obtain higher magnetic properties than when the magnetic layer 4 is formed on the coil pattern 3 through a film or the like. Whether the magnetic layer 4 has been directly applied onto the surface 2a of the substrate 2 can be determined based on whether another member such as a film is interposed between the coil pattern 3 and the magnetic layer 4 and whether a part of the magnetic layer 4 is filled within the height range of the coil pattern 3 with respect to the surface 2a of the substrate 2. When the magnetic layer 4 is directly applied, the coil pattern 3 and the magnetic particles are brought close to each other, and they partially contact each other.

Figure 3:
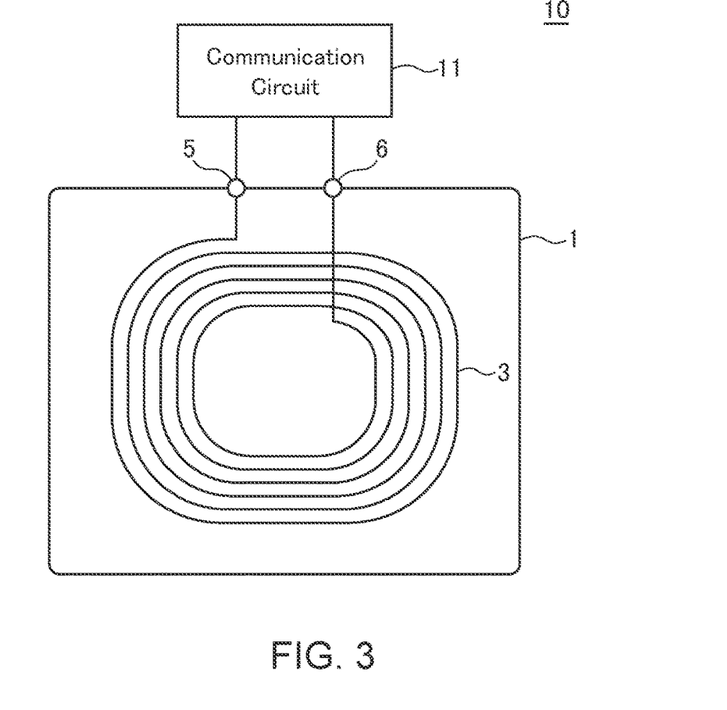
FIG. 3 is a schematic view of a wireless communication circuit 10 including the coil component 1 and a communication circuit 11.

As illustrated in FIG. 3, the thus configured coil component 1 is connected to a communication circuit 11 to constitute a wireless communication circuit 10. A pair of terminal electrodes provided in the communication circuit 11 are connected respectively to terminal electrodes 5 and 6 of the coil component 1. The communication circuit 11 supplies a signal having a frequency of 10 MHz or more to the coil pattern 3 to make the coil pattern 3 function as an antenna coil of the wireless communication circuit 10. As an example, when a signal having a frequency of 13.56 MHz is supplied to the coil pattern 3, the coil pattern 3 can be used as an antenna coil for near-field communication (NFC).

Figure 4:
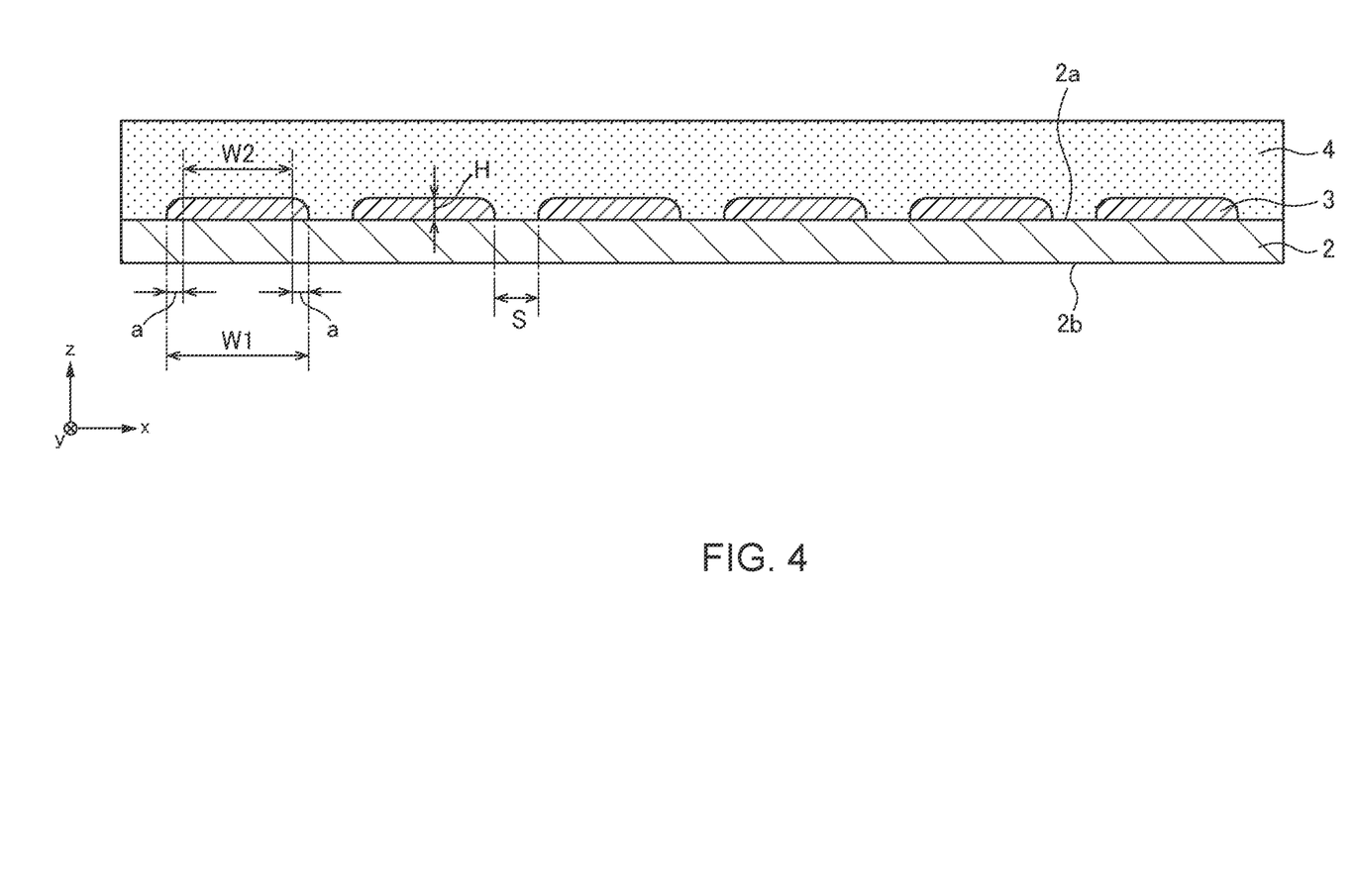
FIG. 4 is a schematic cross-sectional view taken along the line A-A in FIG. 2.

FIG. 4 is a schematic cross-sectional view taken along the line A-A in FIG. 2.

As illustrated in FIG. 4, the radial cross section of the coil pattern 3 has a flat shape in which a thickness H is smaller than a width W1. The width W1 denotes the dimension of a part of the coil pattern 3 that contacts the surface 2a of the substrate 2. As illustrated in the radial cross section of the coil pattern 3 of FIG. 4, the upper corners are chamfered such that the width becomes smaller as the height position with respect to the surface 2a of the substrate 2 increases. Thus, a width W2 of the flat part of the upper surface of the coil pattern 3 is smaller than the width W1 of the part contacting the surface 2a of the substrate 2. A radial width a of the chamfered part is (W1−W2)/2. Although the coil pattern 3 is not particularly limited in size, the width W1 of the coil pattern 3 is about 0.15 mm to 2 mm, the thickness H is about 10 μm to 70 μm, the width a of the chamfered part is about 20 μm to 70 μm, and a space S between radially adjacent turns of the coil pattern 3 is about 0.1 mm to 0.25 mm. The width a of the chamfered part can be controlled by plating conditions set when the coil pattern 3 is formed.

As to the thickness H of the coil pattern 3, the larger the thickness H, the smaller a DC resistance becomes. However, when the frequency of a signal flowing in the coil pattern 3 is equal to or more than 10 MHz, current flows only along the surface layer of the coil pattern 3 due to a skin effect, so that about 10 μm to 70 μm is sufficient for the thickness H of the coil pattern 3. In particular, when the frequency of a signal flowing in the coil pattern 3 is 13.56 MHz, about 20 μm is sufficient for the thickness H, and about 30 μm is optimum considering manufacturing variations.

Figure 5A:
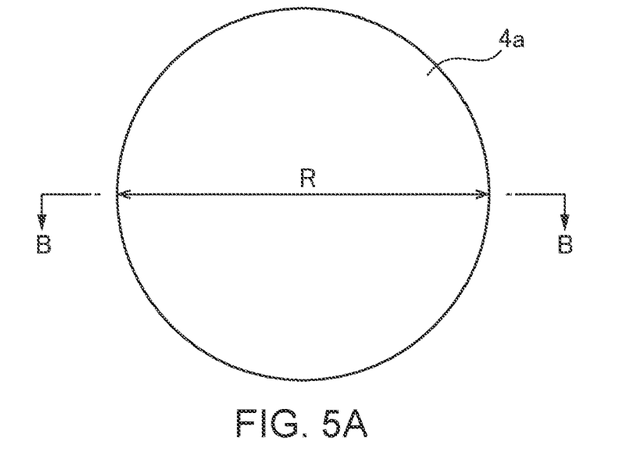
FIG. 5A is a schematic plan view.
Figure 5B:
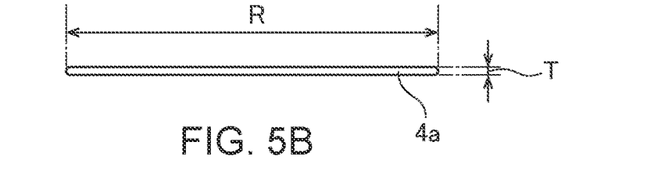
FIG. 5B is a schematic cross-sectional view taken along the B-B line in FIG. 5A.

FIGS. 5A and 5B are schematic views for explaining the shape of a magnetic particle 4a contained in the magnetic layer 4. FIG. 5A is a schematic plan view, and FIG. 5B is a schematic cross-sectional view taken along the line B-B in FIG. 5A.

Figure 6:
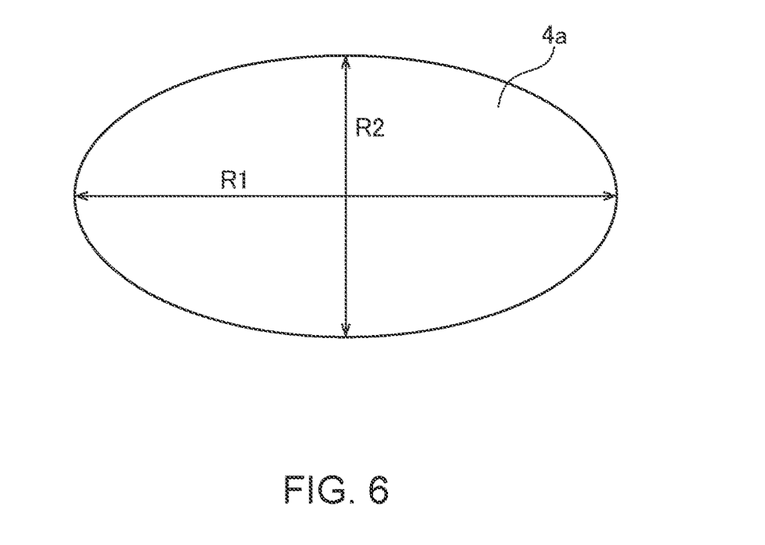
FIG. 6 is a schematic view of the magnetic particle 4a having an elliptic planar shape.

As illustrated in FIGS. 5A and 5B, the magnetic particle 4a contained in the magnetic layer 4 has a flat disk shape. A large number of magnetic particles 4a are contained in the magnetic layer 4 and thus vary in size and shape. The average diameter R of the magnetic particles 4a is about 20 μm to 70 μm, and the average thickness T thereof is about 0.5 μm to 2 μm. To specify the average diameter R and average thickness T, the cross section of a sample of the magnetic layer 4 is observed by a SEM, and the thicknesses and diameters of the magnetic particles 4a existing in a predetermined area are measured and averaged. The thickness or diameter at a cumulative frequency of 50% may be defined as the average thickness or average diameter. Further, as illustrated in FIG. 6, the magnetic particle 4a may have an elliptical plane. In this case, the major axis R1 is about 20 μm to 70 μm, and the ratio (R1/R2) of the major axis R1 to the minor axis R2 is about 1 to 1.5.

Figure 7A:
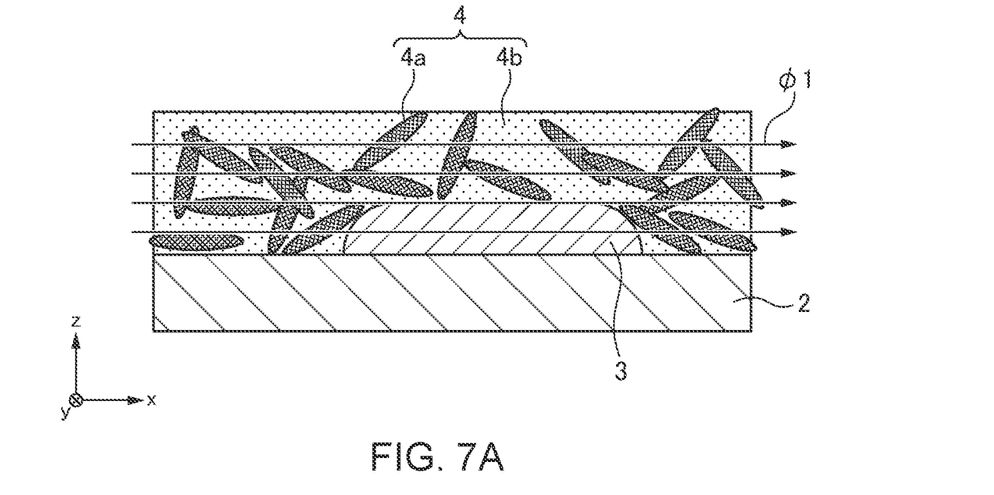
FIGS. 7A and 7B are schematic views for explaining the orientation of the magnetic particles 4a in the magnetic layer 4 and illustrate states before and after magnetic field orientation, respectively.
Figure 7B:
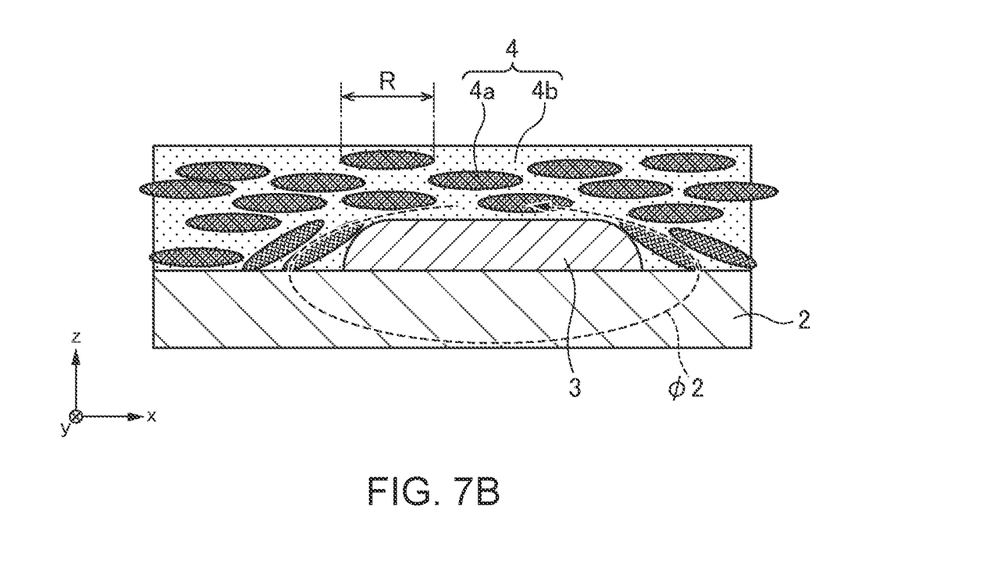

FIGS. 7A and 7B are schematic views for explaining the orientation of the magnetic particles 4a in the magnetic layer 4 and illustrate states before and after magnetic field orientation, respectively.

The magnetic layer 4 is made of a composite material obtained by dispersing the magnetic particles 4a in resin 4b as a binder. As illustrated in FIG. 7A, the orientation of the magnetic particles 4a in a state before magnetic field orientation being performed is almost random. When a strong external magnetic field φ1 is applied in this state, the magnetic particles 4a are oriented in a direction along the external magnetic field φ1. Thus, when the external magnetic field φ1 in a direction along the surface 2a of the substrate 2 is applied, almost all the magnetic particles 4a are oriented horizontally, i.e., such that the thickness direction of the magnetic particles 4a coincides with the z-direction, as illustrated in FIG. 7B. Accordingly, the magnetic layer 4 has a higher permeability in the horizontal direction (xy plane direction) than in the thickness direction (z-direction), with the result that anisotropy is given to the permeability. To sufficiently enhance the permeability in the horizontal direction of the magnetic layer 4, the magnetic particles 4a preferably have an average diameter R of 30 μm or more.

On the other hand, in an area where the coil pattern 3 and the magnetic particles 4a interfere with each other, the magnetic particles 4a are oriented not horizontally but obliquely along the chamfered part. However, in this area, a magnetic field φ2 generated from the coil pattern also travels obliquely, with the result that the effective permeability increases. That is, the magnetic particles 4a are oriented substantially horizontally in an area (area above the coil pattern 3) where the magnetic field φ2 travels horizontally, while the magnetic particles 4a are oriented obliquely in an area (the vicinity of the corner of the coil pattern 3) where the magnetic field φ2 travels obliquely, so that most of the magnetic field φ2 passes the magnetic particles 4a, while the amount of magnetic field components that pass the resin 4b deceases. To bring the orientation of the magnetic particles 4a positioned in the vicinity of the corner of the coil pattern 3 close to the orientation of the magnetic field φ2, the average diameter R (or R1) of the magnetic particles 4a is preferably set to ⅕ or more and 10 times or less of the radial width a of the chamfered part.

In the present embodiment, the magnetic particle 4a has a flat shape, so that when the aspect ratio of the coil pattern 3 is high, it becomes difficult for the magnetic particles 4a to enter between adjacent turns of the coil pattern 3. However, in the present embodiment, the coil pattern 3 itself has a flat shape and thus has an aspect ratio of less than 1, preferably, 0.2 to 0.05, allowing the magnetic particles 4a having a flat shape to easily enter between adjacent turns of the coil pattern 3. In other words, some of the magnetic particles 4a are reliably disposed within the height range of the coil pattern 3 with respect to the surface 2a of the substrate 2.

Figure 8A:
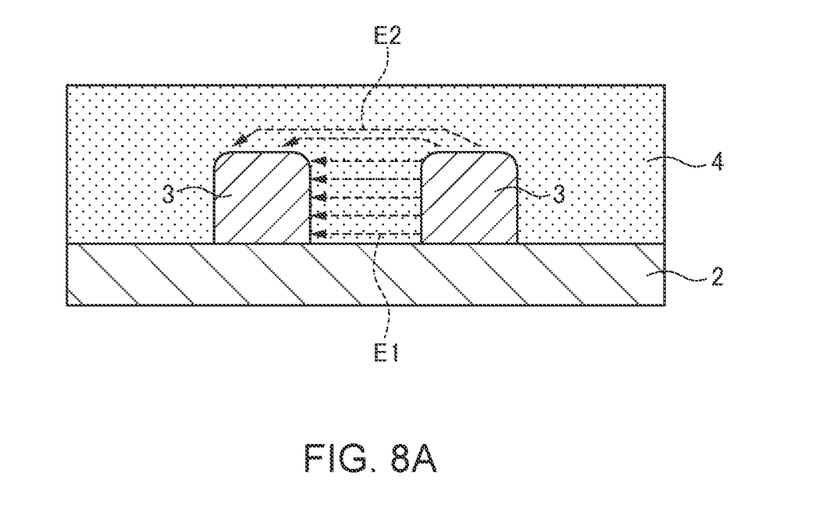
FIG. 8A illustrates a case where the aspect ratio of the coil pattern 3 is 1 or more.
Figure 8B:
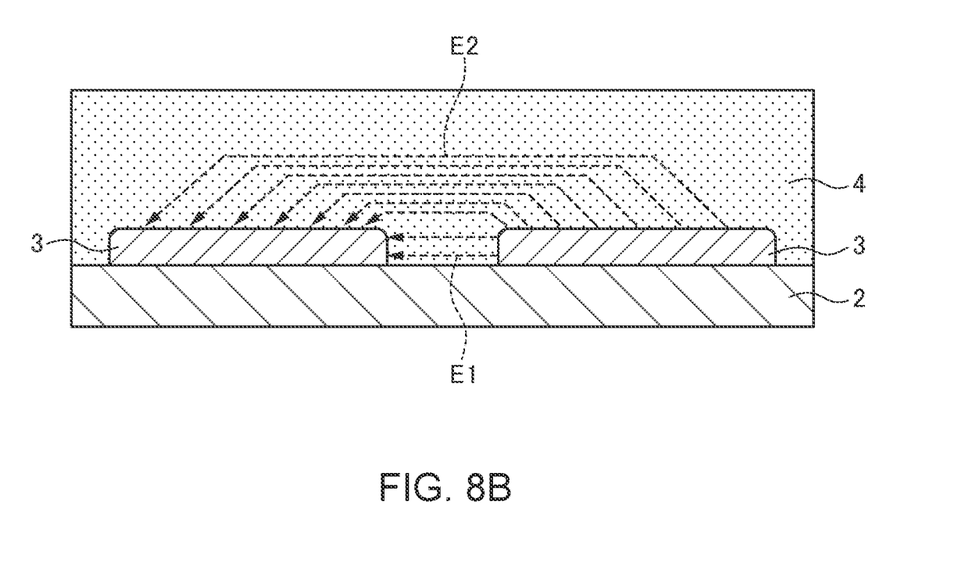
FIG. 8B illustrates a case where the aspect ratio of the coil pattern 3 is less than 1.

When the frequency of a signal flowing in the coil pattern 3 is 10 MHz or more, a parasitic capacitance between the turns of the coil pattern 3 significantly affects the self-resonant frequency, so that it is necessary to reduce the parasitic capacitance between the turns of the coil pattern 3 as much as possible. In this regard as well, in the present embodiment, since the coil pattern 3 has a flat shape, the parasitic capacitance can be reduced. That is, as illustrated in FIG. 8A, when the aspect ratio of the coil pattern 3 is 1 or more, electric force lines E1 proceeding in the horizontal direction are generated between adjacent turns of the coil pattern 3, so that a large parasitic capacitance is generated at this portion. However, as illustrated in FIG. 8B, when the aspect ratio of the coil pattern 3 is reduced to less than 1, the opposing area between radially adjacent turns of the coil pattern 3 is reduced to reduce the electric force lines E1. Thus, even when the space S between radially adjacent turns of the coil pattern 3 is comparatively small, the parasitic capacitance between the turns of the coil pattern 3 can be reduced.

To further reduce the parasitic capacitance between adjacent turns of the coil pattern 3, the width W1 of the coil pattern 3 is preferably reduced in addition to a reduction in the aspect ratio of the coil pattern 3 to less than 1. This is because, in the present embodiment, the magnetic particles 4a constituting the magnetic layer 4 are oriented in the horizontal direction, so that when the width W1 of the coil pattern 3 is large, electric force lines E2 connecting the upper surfaces of the turns of the coil pattern 3 through the magnetic particles 4a cannot be ignored. As described above, to sufficiently enhance the permeability of the magnetic layer 4, the magnetic particles 4a preferably have an average diameter R of 30 μm or more. Considering this, the width W1 of the coil pattern 3 is preferably set to 1 time or more and 10 times or less of the diameter R of the magnetic particle 4a. For example, the average diameter R (or R1) of the magnetic particles 4a is 30 μm, the width W of the coil pattern 3 is preferably set to 300 μm or less.

As described above, according to the present embodiment, there can be provided a coil component suitable for an antenna coil for transmitting and receiving signals of 10 MHz or more.

It is apparent that the present disclosure is not limited to the above embodiments, but may be modified and changed without departing from the scope and spirit of the disclosure.

As described above, a coil component according to the present disclosure includes: a substrate; a coil pattern formed on one surface of the substrate; and a magnetic layer comprising a composite material obtained by dispersing magnetic particles in resin and formed on the one surface of the substrate so as to cover the coil pattern. The coil pattern has a flat shape in which the thickness thereof is smaller than the radial width. Each of the magnetic particles has a flat shape in which the thickness thereof in a direction perpendicular to the one surface of the substrate is smaller than the diameter in a direction parallel to the one surface of the substrate, and some of the magnetic particles exist within the height range of the coil pattern with respect to the one surface of the substrate.

According to the present disclosure, the magnetic particles each have a flat shape and are oriented in a direction parallel to the surface of the substrate, thereby enhancing the permeability of the magnetic layer. Further, the coil pattern also has a flat shape, allowing the magnetic particles to be disposed at radial both sides of the coil pattern, which makes it possible to obtain high-quality magnetic properties.

In the present disclosure, the radial cross section of the coil pattern may be chamfered such that the radial width becomes smaller as the height position with respect to the one surface of the substrate increases. It follows that the magnetic particles are disposed obliquely along the chamfered part, allowing the direction of a magnetic field generated from the coil pattern and the orientation direction of the magnetic particles to be aligned with each other. In this case, the average diameter of the magnetic particles may be ⅕ or more and 10 times or less of the radial width of the chamfered part. This makes the direction of the magnetic field and the orientation direction of the magnetic particles to be aligned more easily.

In the present disclosure, the average diameter of the magnetic particles may be 30 μm or more, and the radial width of the coil pattern may be 1 time or more and 10 times or less of the average diameter of the magnetic particles. This can sufficiently enhance the permeability of the magnetic layer and reduce a capacitance between turns of the coil pattern through the magnetic particles. Thus, when a communication circuit that supplies signals of 10 MHz or more is connected to the coil pattern to constitute a wireless communication circuit, it is possible to prevent a reduction in the self-resonant frequency.

As described above, according to the present disclosure, in a coil component having a structure in which the coil pattern is covered with the magnetic layer, it is possible to enhance the permeability of the magnetic layer.

What is claimed is:

1. A coil component comprising:
   a substrate;
   a coil pattern formed on one surface of the substrate; and
   a magnetic layer comprising a composite material obtained by dispersing magnetic particles in resin and formed on the one surface of the substrate so as to cover the coil pattern,
   wherein the coil pattern has a flat shape in which a thickness thereof is smaller than a radial width thereof,
   wherein each of the magnetic particles has a flat shape in which a thickness thereof in a direction perpendicular to the one surface of the substrate is smaller than a diameter thereof in a direction parallel to the one surface of the substrate,
   wherein some of the magnetic particles exist within a height range of the coil pattern with respect to the one surface of the substrate,
   wherein the coil pattern is divided into i) a lower section including a bottom surface contacting the one surface of the substrate and ii) an upper section including a top surface opposite the bottom surface such that a thickness of the upper section is greater than a thickness of the lower section in a thickness direction of the coil pattern, and
   wherein, in a radial cross section of the coil pattern, the coil pattern is chamfered such that the upper section includes a portion in which the radial width of the coil pattern in the upper section decreases as the thickness of the coil pattern increases and does not include a portion in which the radial width of the coil pattern increase as the thickness of the coil pattern increases.

2. The coil component as claimed in claim 1, wherein an average diameter of the magnetic particles is ⅕ or more and 10 times or less of the radial width of the chamfered part.

3. The coil component as claimed in claim 1,
   wherein an average diameter of the magnetic particles is 30 μm or more, and
   wherein the radial width of the coil pattern is 1 time or more and 10 times or less of the average diameter of the magnetic particles.

4. A wireless communication circuit comprising:
   a coil component; and
   a communication circuit that supplies signals of 10 MHz or more,
   wherein the coil component comprises
      a substrate;
      a coil pattern formed on one surface of the substrate; and a magnetic layer comprising a composite material obtained by dispersing magnetic particles in resin and formed on the one surface of the substrate so as to cover the coil pattern, wherein the coil pattern has a flat shape in which a thickness thereof is smaller than a radial width thereof, wherein each of the magnetic particles has a flat shape in which a thickness thereof in a direction perpendicular to the one surface of the substrate is smaller than a diameter thereof in a direction parallel to the one surface of the substrate, wherein some of the magnetic particles exist within a height range of the coil pattern with respect to the one surface of the substrate, wherein an average diameter of the magnetic particles is 30 μm or more, wherein the radial width of the coil pattern is 1 time or more and 10 times or less of the average diameter of the magnetic particles, wherein the coil pattern is divided into i) a lower section including a bottom surface contacting the one surface of the substrate and ii) an upper section including a top surface opposite to the bottom surface such that the upper section is greater in thickness than the lower section, and wherein, in a radial cross section of the coil pattern, the coil pattern is chamfered such that the upper section includes a portion in which the radial width of the coil pattern in the upper section decreases as the thickness of the coil pattern increases and does not include a portion in which the radial width of the coil pattern increase as the thickness of the coil pattern increases.

5. The coil component as claimed in claim 1, wherein the lower section has a shape in which a reduction in a radial width per unit height becomes greater as a position in the height direction becomes higher.

6. The coil component as claimed in claim 5, wherein a first reduction amount in the radial width per unit height in the upper section is greater than a second reduction amount in the radial width per unit height in the lower section.

7. The coil component as claimed in claim 1, wherein the lower section has a shape in which the radial width is substantially constant.

8. The coil component as claimed in claim 1, wherein the thickness of the coil pattern is smaller than the diameter of the magnetic particles.

9. The coil component as claimed in claim 1, wherein a space between adjacent turns of the coil pattern is equal to or less than 0.25 mm.

10. The coil component as claimed in claim 9, wherein the space is equal to or more than 0.1 mm.

11. The coil component as claimed in claim 1, wherein a space between adjacent turns of the coil pattern is smaller than the radial width of the coil pattern.

12. The coil component as claimed in claim 11, wherein the space between adjacent turns of the coil pattern is smaller than a radial width of the top surface that is substantially flat.

13. A coil component comprising:
a substrate;
a coil pattern formed on the substrate; and
a magnetic layer covering the substrate so as to embed the coil pattern therein, wherein the coil pattern has a shape in which a thickness thereof is smaller than a radial width thereof, wherein magnetic layer including magnetic particles and a resin, wherein each of the magnetic particles has a flat shape in which a thickness thereof is smaller than a diameter thereof, wherein some of the magnetic particles exist within a height range of the coil pattern with respect to the substrate, and wherein the thickness of the coil pattern is smaller than the diameter of the magnetic particles.

14. The coil component as claimed in claim 13,
wherein the coil pattern is divided into i) a lower section including a bottom surface contacting the substrate and ii) an upper section including a top surface opposite the bottom surface, and wherein the lower section has a shape in which a reduction in the radial width per unit height becomes greater as a position in a height direction becomes higher.

15. The coil component as claimed in claim 14, wherein the upper section has a shape in which a reduction in the radial width per unit height becomes greater as a position in the height direction becomes higher.

16. The coil component as claimed in claim 15, wherein a first reduction amount in the radial width per unit height in the upper section is greater than a second reduction amount in the radial width per unit height in the lower section.

17. The coil component as claimed in claim 16, wherein the upper section is greater in thickness than the lower section.

18. The coil component as claimed in claim 15, wherein a space between adjacent turns of the coil pattern is smaller than the radial width of the coil pattern.

19. The coil component as claimed in claim 18, wherein the space between adjacent turns of the coil pattern is smaller than a radial width of the top surface that is substantially flat.

* * * * *